May 28, 1935. O. C. JACKSON 2,003,197
BUTTER MOLDING DEVICE
Filed Feb. 16, 1934

Inventor:-
Ollie C. Jackson
by her Attorneys
Howson & Howson

Patented May 28, 1935

2,003,197

UNITED STATES PATENT OFFICE 2,003,197

BUTTER-MOLDING DEVICE

Ollie C. Jackson, Bryn Mawr, Pa.

Application February 16, 1934, Serial No. 711,595

11 Claims. (Cl. 31—43)

This invention relates to new and useful improvements in devices for molding butter and more particularly to devices for making so called butter balls.

The principal object of the invention is to provide a device of the general character set forth which may be used by housewives and servants in the domestic kitchen.

Another object of the invention is to provide a device of the stated character having novel means associated therewith for scoring or lining the spherical surface of the butter balls as well as freeing the butter from the walls of the mold.

Certain other features of the invention and the details of construction thereof are set forth hereinafter and shown in the accompanying drawing, in which.

Figure 1:
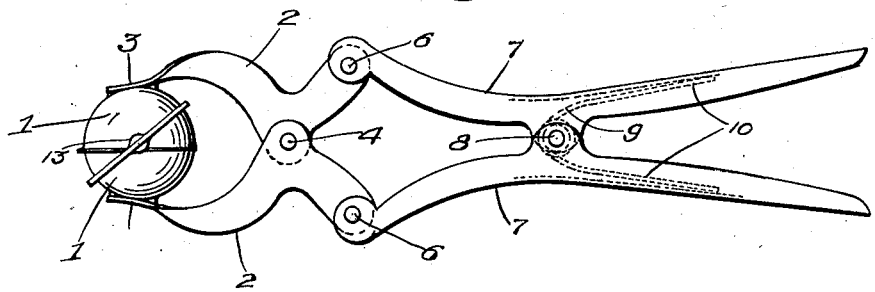
Fig. 1 is a view in plan showing the invention in the closed or molding position.

Heretofore butter balls have for the most part been formed by means of a pair of wooden paddles, the butter being disposed therebetween and made round by a relative rotation of the paddles with respect to each other. The faces of the paddles which contact the butter are usually scored so that the surface of the finished butter ball will be lined. This method of making butter balls takes considerable time and a reasonable amount of care and diligence in the making.

By the present invention a device is provided whereby butter balls may be made in a relatively short period of time with little labor on the part of the operator.

Referring now particularly to the drawing, reference numerals 1, 1 designate semi-spherical sections arranged so that when in a closed position they will cooperate to form a spherical mold for the butter. One end of an arm 2 is rigidly secured to the exterior of each of the mold sections 1, 1 as at 3. The arms 2 curve downwardly in the direction of each other to a point below the sections 1, 1 and are connected together by means of a pivot 4, the arms then extending downwardly from said pivot 4 as shown in the drawing and having their extremities pivotally connected as at 6 to the upper ends of a pair of arcuately opposed handles 7 also connected together by means of a pivot 8 adjacent their mid points. A spring 9 is coiled about the pivot 8 connecting the handles 7 and has its ends extending downwardly against the inner side of each of the handles 7 as indicated at 10 in Fig. 1 of the drawing for the purpose of exerting an expanding or outward force on said handles tending to maintain the mold in an open relation as shown in Fig. 2.

In the present instance an arcuate element 11 having a handle or other actuating means 12 is rotatably journaled in the walls of one of the sections 1 as at 13, 13, and a number of teeth or projections 14 are formed on said member 11 and extend inwardly thereof toward the center for the purpose of engaging the butter in the mold when rotated by the handle 12 and scoring or lining the surface of said butter as well as freeing the butter from the walls of said mold.

The particular leverage arrangement of the arms 2 and handles 7 is an important feature of the invention as it enables the operator of the device to dig into a mass of relatively cold hard butter and close the sections 1, 1 tightly together about the butter without the exercise of more than ordinary pressure and strength.

Figure 2:
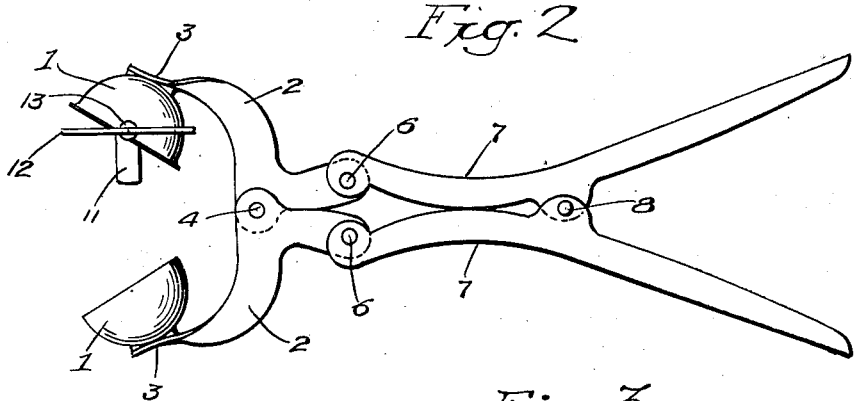
Fig. 2 is a view similar to Fig. 1 showing the device in open position.
Figure 3:
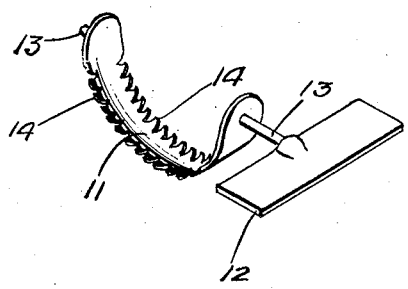
Fig. 3 is an enlarged view in perspective of the scoring or lining element mounted in one of the mold sections.

In operation of the device a portion of butter sufficient to completely fill the spherical mold is scooped from a general mass of said butter by one or the other of the sections 1, 1 and the handles 7 are then pressed together thus closing the sections, as shown in Fig. 1 completely around the butter. The arcuate member 11 is then rotated within the mold by its handle 12 to free the butter from the walls thereof and at the same time cause the surface of the butter to be scored or lined by means of the teeth or projections 14 thereon. Pressure on the handles 7 may then be released allowing the sections of the mold to separate and discharge the finished butter ball.

While a specific form of the invention has been set forth for the purpose of description, it is not intended that the invention shall be precisely limited thereto within the scope of the appended claims.

What I claim is:

1. In a device, a sectional mold, means rotatably mounted internally of said mold for separating material from the walls thereof, and means forming a part of said last mentioned means operable to score the surface of said material.

2. In a device, a sectional mold, means rotatably mounted in one of the sections of said mold for separating material from the walls thereof, and means forming a part of said last mentioned means operable to simultaneously score the surface of said material during rotation of the separating means.

3. In a mold, a pair of semi-spherical sections arranged for cooperation to form a spherical mold, an arcuate separator rotatably journaled in one of the mold sections, inwardly extending projections on the separator arranged to score the surface of material in the mold, and means connected to each of said sections for closing the same.

4. In a mold, a pair of semi-spherical sections arranged for cooperation to form a spherical mold, an arcuate separator rotatably journaled in one of the mold sections, inwardly extending projections on the separator arranged to score the surface of material in the mold, means connected to each of said sections for closing the same, and resilient means associated with said last mentioned means tending to maintain the sections separated.

5. In a mold, a pair of semi-spherical sections arranged for cooperation to form a spherical mold, an arm connected at one end to each of said sections, said arms being pivotally connected together adjacent the other ends thereof, a pair of arcuately opposed handles connected together adjacent their mid-points by means of a pivot and having their upper ends pivotally connected respectively to the other ends of the arms, a spring embracing the pivot connecting the handles tending to separate the same, an arcuate separator rotatably journaled in one of the mold sections, and inwardly extending projections on the separator arranged to score the surface of material in the mold.

6. In a mold, a pair of semi-spherical sections arranged for cooperation to form a spherical mold, an arm connected at one end to each of said sections, said arms being pivotally connected together, a pair of arcuately opposed handles connected together by means of a pivot and having their upper ends pivotally connected respectively to the other ends of the arms, an arcuate separator rotatably journaled in one of the mold sections, and inwardly extending projections on the separator arranged to score the surface of material in the mold.

7. The combination with a mold, of means rotatable within said mold operable to separate material from the walls of the mold and simultaneously score the surface of said material.

8. The combination with a mold, of means rotatable within said mold for separating material contained therein from the walls of the mold, and means forming a part of the first mentioned means to score the surface of said material during rotation of said separating means.

9. In a device, the combination with a mold, of means operable to separate material contained in said mold from the walls thereof and simultaneously score the surface of said material.

10. The combination with a mold, of means rotatably operable to separate material contained in said mold from the walls thereof and simultaneously score the surface of said material.

11. A device for making butter balls including a sectional mold and means rotatable within said mold operable to score the surface of material contained therein.

OLLIE C. JACKSON.